No. 776,357. PATENTED NOV. 29, 1904.
W. J. SHIELDS.
FOOT PROPELLED VEHICLE.
APPLICATION FILED MAY 4, 1904.

NO MODEL. 4 SHEETS—SHEET 1.

WITNESSES:

INVENTOR
William J. Shields
BY
ATTORNEYS

No. 776,357. PATENTED NOV. 29, 1904.
W. J. SHIELDS.
FOOT PROPELLED VEHICLE.
APPLICATION FILED MAY 4, 1904.
NO MODEL. 4 SHEETS—SHEET 2.

WITNESSES:

INVENTOR
William J. Shields
BY
ATTORNEYS

No. 776,357. PATENTED NOV. 29, 1904.
W. J. SHIELDS.
FOOT PROPELLED VEHICLE.
APPLICATION FILED MAY 4, 1904.
NO MODEL. 4 SHEETS—SHEET 3.
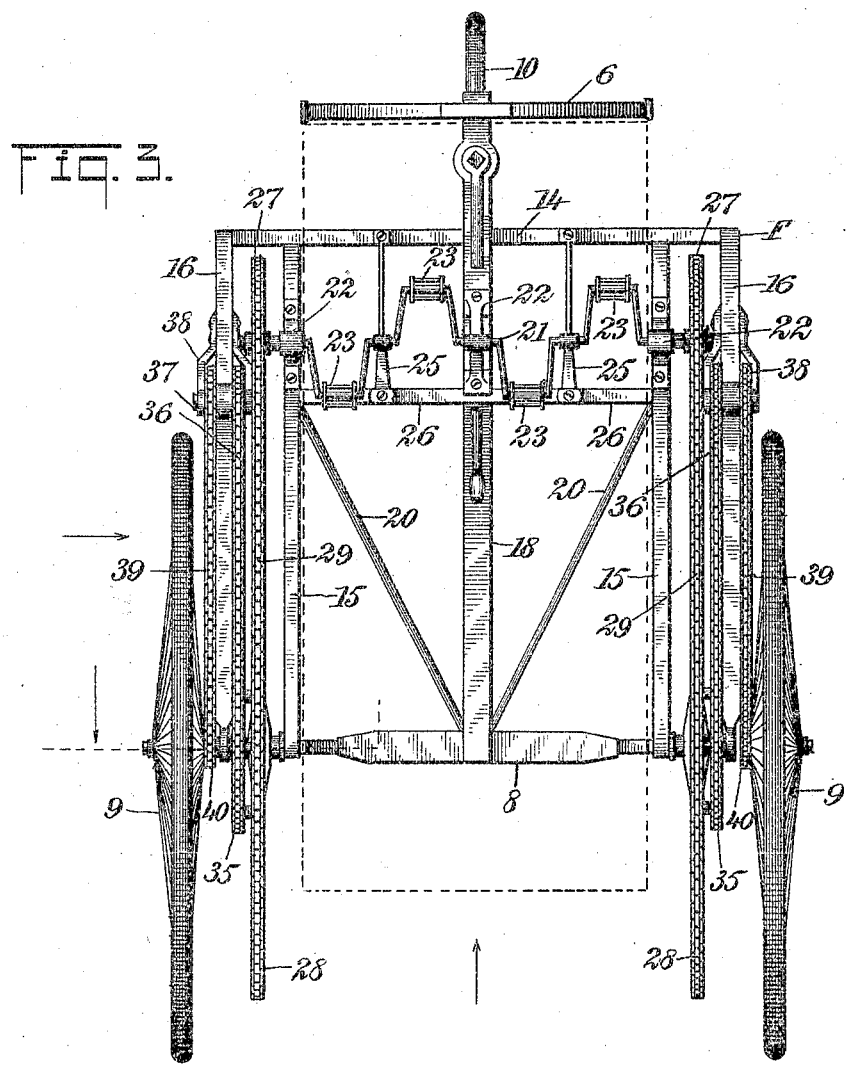
WITNESSES:
INVENTOR
William J. Shields
BY
ATTORNEYS No. 776,357. PATENTED NOV. 29, 1904.
W. J. SHIELDS.
FOOT PROPELLED VEHICLE.
APPLICATION FILED MAY 4, 1904.
NO MODEL. 4 SHEETS—SHEET 4.
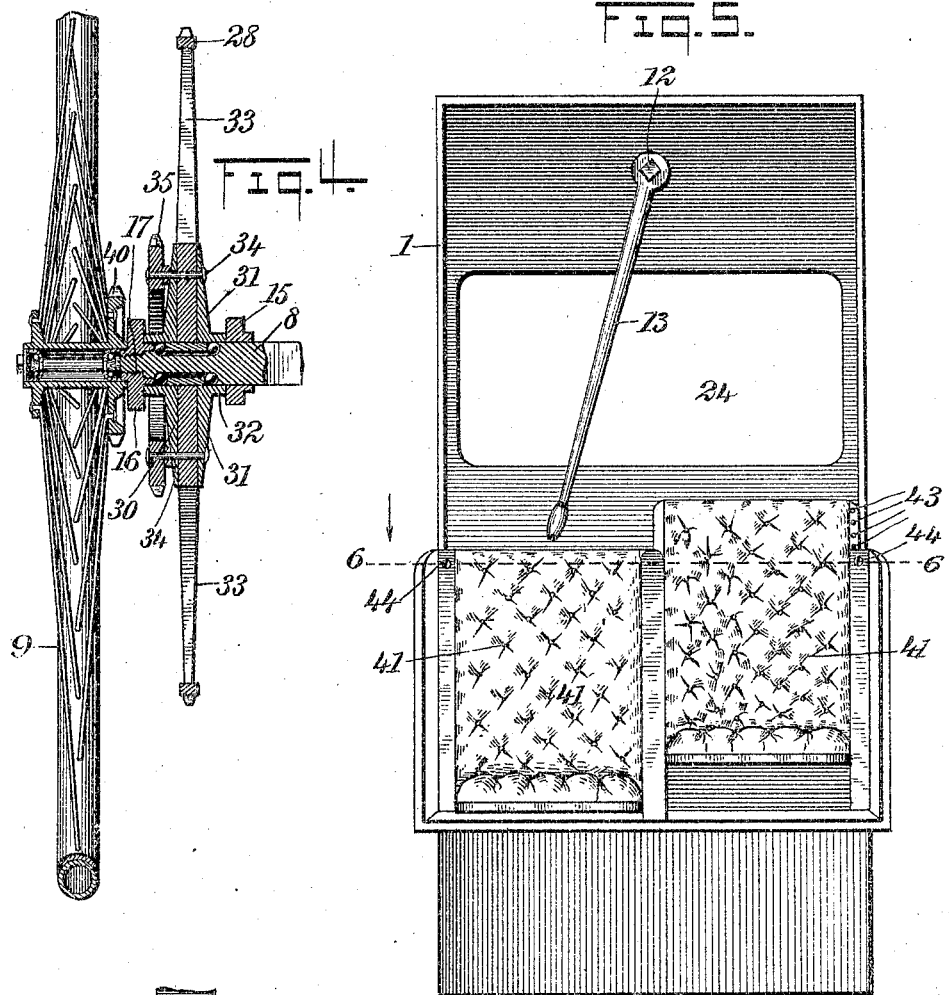
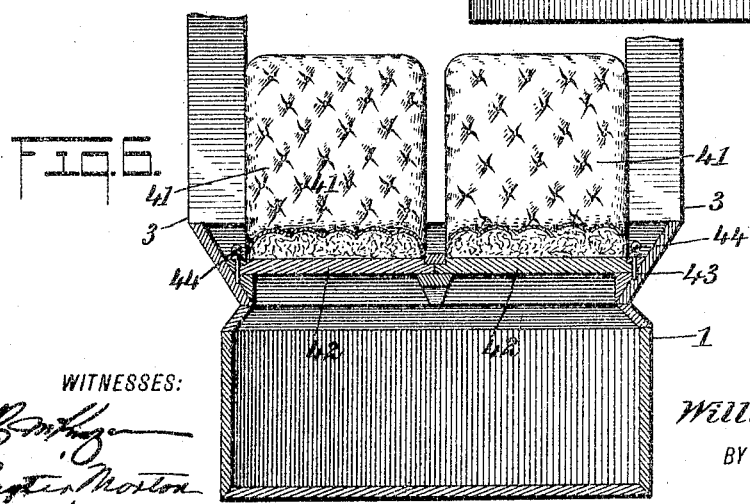
WITNESSES:
INVENTOR
William J. Shields
BY
ATTORNEYS No. 776,357. Patented November 29, 1904.

UNITED STATES PATENT OFFICE.

WILLIAM JOSEPH SHIELDS, OF BEDFORD, ALABAMA.

FOOT-PROPELLED VEHICLE.

SPECIFICATION forming part of Letters Patent No. 776,357, dated November 29, 1904.

Application filed May 4, 1904. Serial No. 206,365. (No model.)

*To all whom it may concern:*

Be it known that I, WILLIAM JOSEPH SHIELDS, a citizen of the United States, and a resident of Bedford, in the county of Lamar and State of Alabama, have invented a new and Improved Foot-Propelled Vehicle, of which the following is a full, clear, and exact description.

This invention relates to vehicles; and the principal object of the invention is to provide a foot-propelled vehicle which will enable the occupants thereof to propel the vehicle easily, while affording a far greater degree of comfort than is usually afforded by vehicles of this class.

A further object of the present invention is to provide a vehicle of the type specified which may be easily controlled and which is adapted to be propelled by one or two persons, the seats of the vehicle being independently adjustable to facilitate the simultaneous effort of two persons of different sizes in the propulsion of the vehicle.

With the objects above stated and others in view, as will hereinafter appear, the invention consists in the novel construction and combination of parts of a foot-propelled vehicle, one embodiment of the invention being hereinafter described in detail, and the novel features thereof being pointed out in the appended claims.

Reference is to be had to the accompanying drawings, forming a part of this specification, in which similar characters of reference indicate corresponding parts in all the views.

Figure 1:
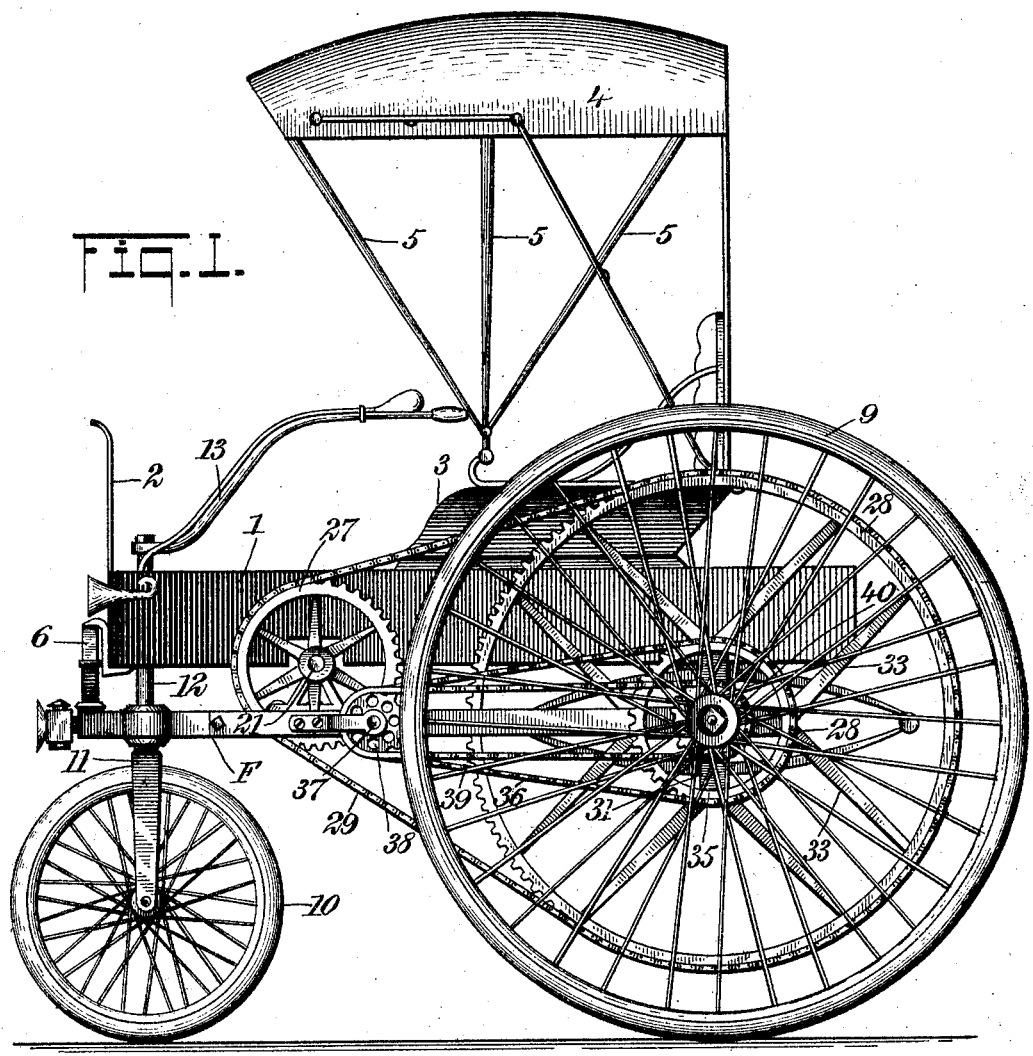
Figure 2:
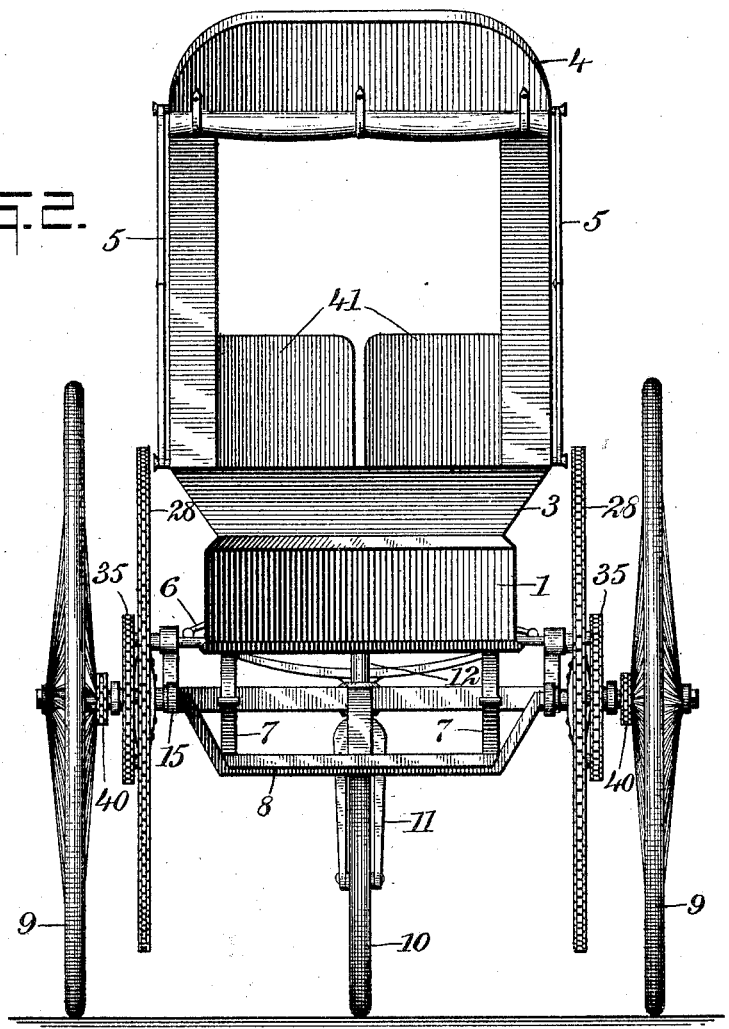

Figure 1 is a view in side elevation of a vehicle constructed in accord with the present invention. Fig. 2 is a view of the vehicle in rear elevation. Fig. 3 is a plan view of the running-gear of the vehicle and propulsion devices, the body, top, and seats being removed. Fig. 4 is a detail view showing the preferred arrangement of the bearings of one of the traction-wheels of the vehicle and for the power-transmitting sprockets mounted upon the same axle with the traction-wheels. Fig. 5 is a top plan view of the vehicle-body, showing the mode of adjusting the position of the seats therein; and
Fig. 6 is a sectional view upon the line 6 6 of
Fig. 5.

Before describing the detailed construction of the vehicle illustrated in the accompanying drawings it may be stated that the present invention contemplates the construction of a vehicle with three or four wheels, as may be desired, the provision of a body of the type generally known as a "buggy-body" upon the running-gear, the arrangement of a crank-shaft and pedals in the forward parts of the body, the provision of suitable transmitting devices between the crank-shaft and the traction-wheels of the vehicle, and the provision of suitable devices for adjusting the seats of the vehicle toward and away from the crank-shaft in order to adapt the vehicle for propulsion by persons of different sizes.

Referring to the drawings by reference characters, 1 designates the body of the vehicle, which is of rectangular form and is preferably provided in front with a dashboard 2 of ordinary type. Toward the rear of the body a seat-frame 3 is provided, and a top 4 is preferably mounted above the seat-frame upon the usual bows 5. The top may be, however, of any preferred type, as the exact character of the top forms no part of the present invention. The body is preferably supported upon a plurality of springs in order to take up jars, and for this purpose a spring 6 is preferably arranged transversely of the body in front, and a pair of springs 7 are preferably arranged longitudinally of the body at the rear and interposed between the body and the rear axle of the vehicle.

The running-gear of the vehicle consists of a suitable frame, (designated generally as F,) an axle 8 at the rear of the frame F, a pair of traction-wheels 9, journaled on the axle, and a steering-wheel 10, provided at the front of the vehicle and mounted in a fork 11. The fork is provided with a steering-head 12, which extends upward through the bottom of the buggy and is provided at the top with a steering-lever 13, which may be of any preferred form.

The frame F, in which the axle 8 is mounted, consists, preferably, of a transverse bar 14 at the front, inner side bars 15, extending rearwardly from the bar 14, and outer side bars 16, also extending rearwardly from the front bar 14. The inner side bars 15 are rigidly connected at their front ends with the bar 14 and at their rear ends are rigidly secured to the axle 8, which is preferably formed between the inner side bars 15 with a depressed portion, upon which the springs 7 rest. The outer side bars 16 are secured at their forward ends to the bar 14 in any suitable manner and at their rear ends are threaded upon reduced threaded portions 17 of the axle, this mode of connection of the side bars 16 and the axle 8 being provided for reasons which will hereinafter appear. Extending longitudinally of the frame F, in the middle thereof, is a center bar 18, which is carried forward beyond the front bar 14 to afford a bearing for the steering-head 12 and a support for the forward spring 6. This center bar 18 extends rearwardly as far as the axle 8, to which it is attached, as shown in Fig. 3. To stiffen the frame F against lateral strains, oblique brace-rods 20 are attached at their rear ends to the axle 8, near the middle thereof, and are carried forward and connected with the side bars 15 some distance from their forward ends.

The preferred mechanism for propelling the vehicle comprises a double crank-shaft 21, which is supported in brackets 22, mounted upon the side bars 14 of the frame F and the center bar 18. These brackets rise to about the normal level of the floor of the body of the vehicle, and the crank-shaft is so constructed that the pedals 23, carried thereby, can be readily operated by riders seated in the vehicle, the bottom of the body 1 being formed with a large substantially rectangular opening 24 to permit the free revolution of the crank-shaft and its pedals. Additional support for the crank-shaft is provided between the brackets 22 by supplementary brackets 25, mounted upon a frame-bar 26 and the forward frame-bar 14. At the outer ends of the crank-shaft 21 a pair of sprockets 27 are rigidly mounted, and from these sprockets motion is imparted to a pair of large sprocket-wheels 28, mounted upon the axle 8 between the inner side bars 15 and the outer side bars 16 of the frame F, endless sprocket-chains 29 being carried over the sprockets 27 and 28 for this purpose. The large sprocket-wheels 28 are preferably constructed in the manner shown in Figs. 1 and 4. The hub of each wheel consists, preferably, of a pair of plates 30, each having four arms 31, projecting radially outward at right angles to each other, and also having a short sleeve 32 to encircle the axle. These plates are spaced apart to receive between them the spokes 33 of the sprocket-wheels, which are secured in position by means of bolts 34 or other suitable fastenings. The bolts 34 also serve to secure smaller sprocket-wheels 35 upon the outer faces of the large sprocket-wheels 28, so that the sprocket-wheels 35 may be wholly supported by the sprocket-wheels 28. The sprocket-wheels 28 are preferably supported on ball-bearings, and to this end races are formed in the axle between the side bars 15 and 16, and balls are fitted therein, the outer side bars 16 being threaded upon the axles to hold the bearings in proper adjustment.

From the sprockets 35 sprocket-chains 36 extend forward and impart movement to the small sprockets mounted at the inner sides of the side bars 16 of the frame F and supported upon the short shafts 37, which are journaled in the side bars 16. At the outer sides of the side bars 16 small sprockets 38 are mounted upon the shafts 37, and sprocket-chains 39, extending rearwardly from the small sprockets 38, engage with small sprockets 40, rigidly attached to the hubs of the traction-wheels 9.

From the foregoing description of the propelling mechanism it will be readily seen that when rotary movement is imparted to the crank-shaft 21 at the front of the vehicle that movement is transmitted through the series of sprockets and chains to the traction-wheels 9 and movement is imparted to the vehicle in a forward or rearward direction, according to the direction of rotation imparted to the crank-shaft.

To facilitate the propulsion of the vehicle as much as possible, seats 41 are arranged side by side within the seat-frame 3 of the body, and these seats 41 are arranged for sliding adjustment toward the crank-shaft. The preferred means employed for adjusting the seats 41 is indicated in Figs. 5 and 6. Each of the seats is provided with a base-board 42, which rests in suitable ways provided in the seat-frame, and at its outer margin each of the base-boards 42 is provided with a series of small openings 43, with which an adjusting-screw 44 is adapted to engage. When it is desired to set one of the seats forward, the adjusting-screw 44 is removed and the seat is drawn forward to the desired extent, and then the adjusting-screw is placed in position in the proper opening 43, so holding the seat against rearward displacement. By making each seat independently adjustable the vehicle is adapted for the simultaneous effort of two persons of different sizes in propelling the vehicle, as each seat may be set at the distance from the crank-shaft at which the occupant of the seat may act to the best advantage in using his feet upon the pedals of the crank-shaft.

It is of course to be understood that the bearings throughout the entire vehicle are to be constructed with a view to the elimination of friction, and where convenient to apply such bearings ball-bearings will be employed. As the exact arrangement of the parts of the bearings forms no part of the present invention, I have not deemed it necessary to illustrate specifically the bearings throughout the entire vehicle, though I have shown the special arrangement of parts in the bearings for the large sprockets 33 and have also shown a form of ball-bearings for the traction-wheels. It is also to be understood that it is desirable to use wheels with elastic tires of either the cushion or pneumatic type, and I have illustrated wheels of that general character; but the construction of the traction-wheels and the steering-wheel may be varied at will without altering the invention in any way.

Ordinarily a brake will not be necessary for a vehicle constructed in accordance with this invention; but it is obvious that brakes may be used, if so desired, and I do not limit myself to any particular form of brake, reserving the right to use brakes operating upon the tires of the traction-wheels or brakes which operate at the hubs of the wheels, as may be preferred.

For convenience in illustration the embodiment of the invention which I have selected to illustrate in the drawings is that in which three wheels are employed; but it is evident that the vehicle may be easily provided with four wheels, if preferred, and as such a change is of obvious character I have deemed it unnecessary to illustrate this form of the invention.

Having thus described my invention, I claim as new and desire to secure by Letters Patent—

1. The combination in a foot-propelled vehicle, of a body, a seat in the body, traction-wheels, a crank-shaft transversely disposed across said body in front of said seat, short shafts journaled in the frame near the front thereof, driving connections between said crank-shaft and sprocket-wheels mounted to turn on the axle, carrying the traction-wheels, and driving connections between said sprocket-wheels and the said short shafts, and between the latter and the traction-wheels.

2. The combination in a foot-propelled vehicle of a running-gear comprising a frame, an axle at the rear of the frame and traction-wheels journaled on the axle, a body carried by said running-gear and having a seat therein, a crank-shaft mounted on said frame and extending transversely of said body in front of the seat, sprocket-wheels carried at the outer ends of said crank-shaft, sprocket-wheels mounted upon the axle carrying the traction-wheels and driven by sprocket-chains from the sprocket-wheels on the crank-shaft, smaller sprocket-wheels secured upon the outer faces of the sprocket-wheels on said axle, short shafts journaled at each side of the frame near the front thereof, sprocket-chains connecting said smaller sprocket-wheels with sprocket-wheels mounted on said short shafts, and a second sprocket-wheel mounted upon each of said short shafts and connected by sprocket-chains with sprocket-wheels attached to the hubs of the traction-wheels.

3. The combination in a foot-propelled vehicle of a running-gear comprising a frame, a rear axle and traction-wheels mounted on the axle, a crank-shaft disposed transversely of said frame near its forward end, a vehicle-body having a transverse opening in the bottom thereof, the said body being mounted upon said running-gear with the opening over the crank-shaft, driving connections between the crank-shaft and wheels mounted loosely on the rear axle, driving connections between the said wheels and shafts journaled at each side of the frame near the front thereof, and driving connections between the latter shafts and the traction-wheels.

4. The combination in a foot-propelled vehicle, of a running-gear comprising a frame including an axle, and traction-wheels mounted on the axle, a crank-shaft transversely mounted upon said frame, a vehicle-body having a transverse opening in the bottom thereof above said crank-shaft, springs carried by said running-gear upon which said vehicle-body is mounted, sprocket-wheels carried by said crank-shaft, sprocket-wheels mounted loosely on the axle in line with the sprocket-wheels on the crank-shaft and driven by sprocket-chains therefrom, smaller sprocket-wheels carried by the sprocket-wheels on the axle, sprocket-wheels connected with said traction-wheels, shafts journaled at opposite side of the frame adjacent to the crank-shaft, sprocket-chains connecting the smaller sprocket-wheels on the axle with sprocket-wheels on said shafts, and a second sprocket-wheel on each of said shafts and connected by sprocket-chains with the sprocket-wheels on the traction-wheels.

5. The combination in a foot-propelled vehicle, of a running-gear comprising a frame and traction-wheels, a crank-shaft disposed transversely of said frame, a body having a transverse opening therein above said crank-shaft, the body being mounted upon said running-gear, the said body having a seat-frame provided with guideways, and seats arranged side by side within the seat-frame and each provided with a base-board slidably mounted in said guideways, whereby the seats can be independently adjusted toward and from said crank-shafts.

6. The combination in a foot-propelled vehicle, of a running-gear, a crank-shaft mounted on the running-gear and disposed transversely thereof, driving connections between the crank-shaft and the running-gear, a vehicle-body having a transverse opening therein at the front portion, the said body being mounted upon the running-gear with the opening above the crank-shaft, a seat-frame for said body provided with guideways, seats arranged side by side within the seat-frame and each provided with a base-board slidably mounted in said guideways, to permit of adjusting the seats toward and from said crank-shaft, and means for holding said seats in the adjusted position.

7. The combination in a foot-propelled vehicle, of a running-gear comprising a frame and traction-wheels, a crank-shaft disposed transversely of the frame, a body mounted upon the running-gear and having a transverse opening in its bottom located above said crank-shaft, the said body having a seat-frame provided with guideways, seats arranged side by side within the seat-frame and each provided with a base-board slidably mounted in said guideways, whereby the seats can be moved toward and from said crank-shafts, the outer margin of each of said base-boards being provided with a series of openings, and adjusting-screws adapted to engage said openings.

8. The combination in a foot-propelled vehicle, of a running-gear comprising a frame and traction-wheels, sprocket-wheels mounted to turn loosely on the axle carrying the traction-wheels, sprocket-wheels connected with the traction-wheels, a crank-shaft disposed transversely of the frame, sprocket-wheels rigidly mounted at the end of said crank-shaft, connecting-chains between the sprocket-wheels on the crank-shaft and the sprocket-wheels on the said axle, and sprocket-wheels and connecting-chains interposed between the sprocket-wheels on the axle and the sprocket-wheels connected with said traction-wheels.

9. The combination in a foot-propelled vehicle of a running-gear comprising a frame, having a transverse front bar inner side bars extending rearwardly from the front bar, a frame-bar connecting the inner side bars at the rear of the front bar, outer side bars secured at the forward ends to the front bar and spaced from the inner side bars, and a center bar extending forward beyond the front bar, an axle to which the rear ends of the said outer and inner side bars and the center bar are secured, a steering-wheel having its steering-head mounted in the front end of said center bar and traction-wheels mounted on the axle, upwardly-extending brackets mounted upon the forward part of the frame, a crank-shaft journaled in said brackets, a vehicle-body having a transverse opening in the bottom thereof above said crank-shaft, springs interposed between said body and said running-gear and driving connections between said crank-shaft and said traction-wheels.

In testimony whereof I have signed my name to this specification in the presence of two subscribing witnesses.

WILLIAM JOSEPH SHIELDS.

Witnesses:
S. J. SHIELDS,
TOM MADDOX.